W. V. TURNER.
FLUID PRESSURE GOVERNOR.
APPLICATION FILED DEC. 18, 1918.
1,346,861.
Patented July 20, 1920.
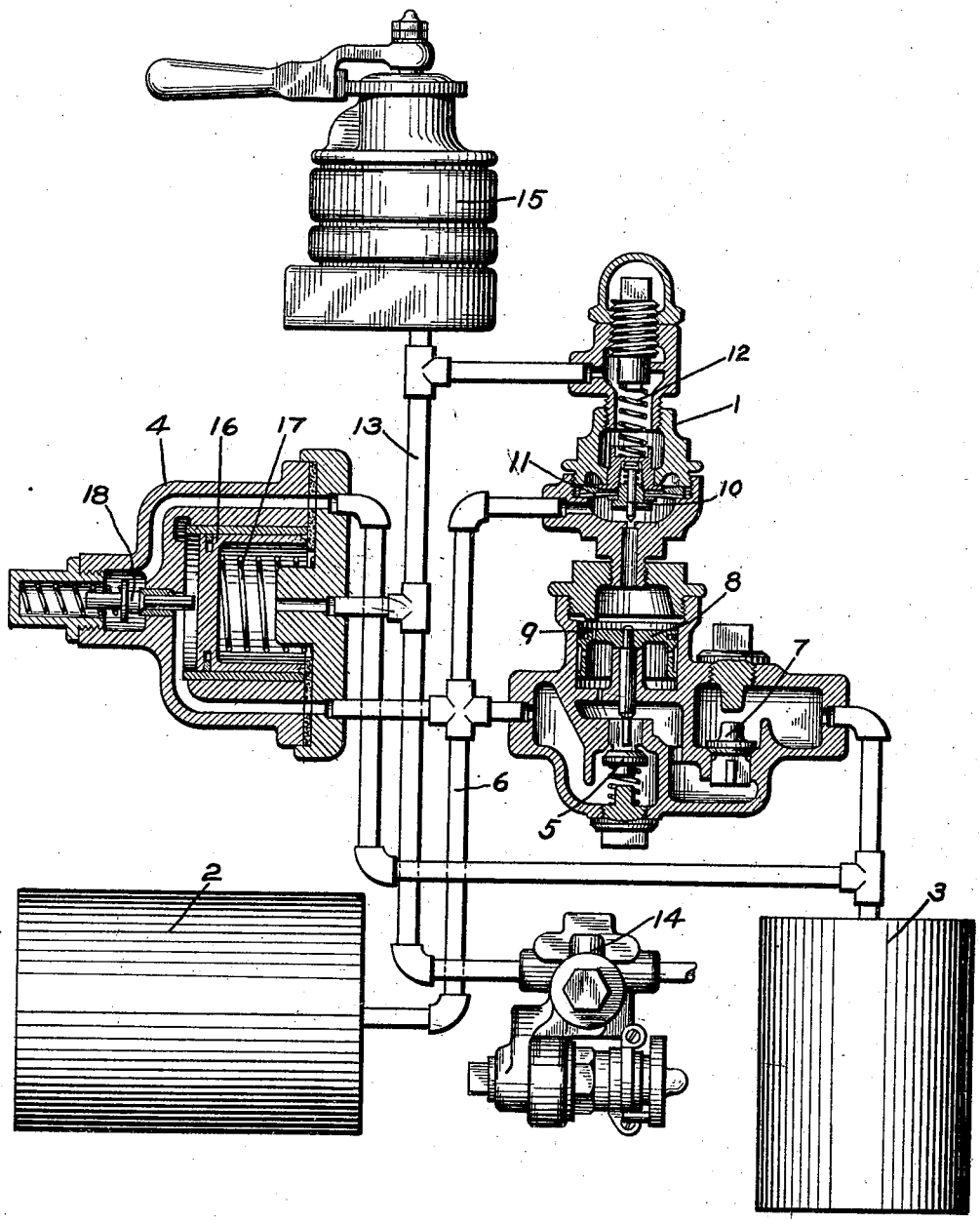
INVENTOR
Walter V. Turner

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE GOVERNOR.

1,346,861.     Specification of Letters Patent.     Patented July 20, 1920.

Application filed December 18, 1918. Serial No. 267,263.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Governors, of which the following is a specification.

This invention relates to devices for regulating the supply of fluid under pressure to a storage reservoir, and more particularly in connection with a fluid pressure brake system.

In railway train service, it is frequently necessary to provide a supply of fluid under pressure for auxiliary devices other than the fluid pressure brake system, and so as not to interfere in any way with the safe and reliable operation of the brakes, an additional storage reservoir is provided, from which fluid under pressure is supplied for the auxiliary devices.

If fluid under pressure is supplied from the main reservoir of the fluid pressure brake system to the additional storage reservoir, the conditions which it is desirable to meet are that fluid will not be supplied from the main reservoir to the additional reservoir while releasing the brakes or recharging the brake system, if the main reservoir pressure is less than a predetermined degree; that the governing mechanism for regulating the supply of fluid to the additional reservoir shall automatically operate at different degrees of main reservoir pressure; that fluid will be supplied in the brake applying positions of the brake valve, so as to prevent depletion of the additional reservoir pressure at such times; and that the governing mechanism can be applied to existing brake systems, without adding ports to or otherwise changing the brake valve.

The principal object of my invention is to provide a mechanism for governing the supply of fluid from the main reservoir to the additional storage reservoir which shall meet the above conditions.

In the accompanying drawing, the single figure is a diagrammatic view, partly in section, of a fluid pressure governing mechanism embodying my invention.

According to my invention, a governor device 1 may be provided which is adapted to prevent the supply of fluid from the main reservoir 2 to the additional storage reservoir 3, when the brakes are being released, or the brake system recharged, in case the main reservoir pressure is less than a predetermined degree.

A second governor device 4 is also provided for supplying fluid from the main reservoir to the additional reservoir when the brakes are applied.

The operation of the governor device 1 is based on the fact that the usual feed valve pipe leading to the brake valve contains fluid at feed valve pressure, corresponding with the pressure carried in the brake system, in the release, running, and holding positions of the brake valve, while in the other positions of the brake valve, the feed valve pipe contains fluid at full main reservoir pressure.

Accordingly, the governor device 1 may comprise a valve 5, for controlling the supply of fluid from the main reservoir 2, through pipe 6, and past check valve 7 to the additional reservoir 3.

For operating the valve 5, a piston 8 is provided, having a restricted port 9 therethrough, and adapted to be operated by varying the fluid pressure on one side.

For effecting the operation of piston 8, a valve 10, adapted to be actuated by a diaphragm 11 is provided and said diaphragm is subject on one side to main reservoir pressure and on the opposite side to the pressure of an adjustable spring 12 and the fluid pressure in feed valve pipe 13, which supplies fluid at a reduced pressure from the main reservoir 2 through feed valve 14 to the usual brake valve 15.

The operation of governor device 4 is based on the fact that the feed valve pipe contains fluid at main reservoir pressure in lap, service, and emergency application positions of the brake valve and accordingly comprises a casing containing a piston 16 subject on one side to the pressure of a spring 17 and fluid pressure in the feed valve pipe 13 and on the opposite side to main reservoir pressure.

The piston 16 is adapted to operate a valve 18 for supplying fluid from the main reservoir 2 to the additional reservoir 3.

In operation, if the brake valve 15 is in running, release, or holding position, the pressure of fluid in the feed valve pipe 13 corresponds with the brake pipe pressure carried in the brake system.

The spring 12 is adjusted so that the pressure of the spring added to the pressure in the brake system, as supplied through pipe 13, will be a predetermined degree less than the full standard main reservoir pressure and consequently, when the brake valve is in running, release, or holding position, and fluid is supplied through the feed valve pipe 13 at the pressure carried in the brake system, if the main reservoir pressure is less than a predetermined degree, the combined pressures of the spring 12 and the fluid pressure in pipe 13 will operate the diaphragm 11 to hold the valve 10 closed and fluid pressures will then equalize through port 9 on opposite sides of piston 8, permitting the valve 5 to close, so that fluid will not be supplied from the main reservoir 2 to the additional reservoir 3.

When the main reservoir pressure has been increased to the predetermined degree, the main reservoir pressure will exceed the combined pressures of the spring 12 and the fluid pressure in feed valve pipe 13, so that the diaphragm 11 is operated to open valve 10 and supply fluid at main reservoir pressure to piston 8. Said piston is then actuated to open the valve 5 and thus supply fluid from the main reservoir to the additional reservoir.

When the brake valve 15 is in lap, service, or emergency application position, the fluid in pipe 13 is at main reservoir pressure, so that the fluid pressures on opposite sides of diaphragm 11 are balanced and the spring 12 acts on the diaphragm to hold the valve 10 closed, regardless of the degree of pressure in the main reservoir, and consequently the valve 5 remains closed so that fluid is not supplied to the additional reservoir by the governor device 1 in the above positions of the brake valve.

When, however, the brake valve is in lap, service, or emergency application position, fluid at main reservoir pressure is supplied from the feed valve pipe 13 to the spring side of piston 16 of the governor device 4, and since the opposite side of the piston is also subject to main reservoir pressure, the spring 17 operates piston 16 so as to open valve 18 and thus permit the supply of fluid from the main reservoir to the additional storage reservoir.

In the other positions of the brake valve, such as running, release, and holding positions, the pressure of fluid in the feed valve pipe 13 being at the reduced pressure of the brake system, which is less than main reservoir pressure, the main reservoir pressure acting on one side of piston 16 is sufficient to overcome the combined pressures of spring 17 and the feed valve pipe pressure, so that piston 16 is operated to permit the valve 18 to close.

It will now be seen that the fluid pressure governing mechanism herein described may be applied to existing brake systems, without changing the ports in the brake valve, while at the same time, it is adapted to supply fluid from the main reservoir while the brakes are applied and to prevent the supply of fluid in releasing the brakes, unless the main reservoir pressure has been increased to a predetermined degree.

Having now described my invention, what I claim as new, and desire to secure by Letters Patent, is:—

1. The combination with a main reservoir of a fluid pressure brake system, of an additional reservoir and a governor device operated according to the opposing pressures of the main reservoir and a conduit having a fluid pressure a predetermined degree less than full main reservoir pressure and operating when the main reservoir pressure slightly exceeds the opposing pressure to supply fluid from the main reservoir to the additional reservoir.

2. The combination with a main reservoir of a fluid pressure brake system, of an additional reservoir and a governor device having a movable abutment subject on one side to main reservoir pressure and on the opposite side to the pressure of a spring and a fluid pressure which is a predetermined degree less than full main reservoir pressure, and operating when the main reservoir pressure slightly exceeds the opposing pressure to supply fluid from the main reservoir to the additional reservoir.

3. The combination with a fluid pressure brake system having a main reservoir and a feed valve device for supplying fluid from the main reservoir at a reduced pressure, of an additional reservoir and a governor device subject to the opposing pressures of the main reservoir and the pressure of fluid supplied by the feed valve device for controlling the supply of fluid from the main reservoir to the additional reservoir.

4. The combination with a main reservoir of a fluid pressure brake system, of an additional reservoir, a governor device operated upon a predetermined increase in main reservoir pressure for supplying fluid from the main reservoir to the additional reservoir, and a second governor device operated by main reservoir pressure for supplying fluid from the main reservoir to the additional reservoir.

5. The combination with a fluid pressure brake system having a main reservoir, a feed valve device, a brake valve, and a feed valve pipe for supplying fluid from the feed valve device to the brake valve, of an additional reservoir, a governor device subject to the opposing pressures of the feed valve pipe and the main reservoir for supplying fluid from the main reservoir to the additional reservoir and a second governor device operated by main reservoir pressure for supplying fluid from the main reservoir to the additional reservoir.

6. The combination with a fluid pressure brake system having a main reservoir, a feed valve device, a brake valve, and a feed valve pipe for supplying fluid from the feed valve device to the brake valve, and containing fluid at feed valve pressure in the brake release positions of the brake valve and fluid at main reservoir pressure in the brake applied positions of the brake valve, of a governor device subject to the opposing pressures of the main reservoir and the feed valve pipe for supplying fluid from the main reservoir to the additional reservoir, and a second governor device actuated by main reservoir pressure in the feed valve pipe for supplying fluid from the main reservoir to the additional reservoir.

7. The combination with a fluid pressure brake system having a main reservoir and a feed valve device, of a feed valve pipe containing fluid at main reservoir pressure at one time, and fluid at the pressure supplied by the feed valve device at another time, an additional reservoir, a governor device subject to the opposing pressures of the main reservoir and the feed valve pipe and operated upon a predetermined increase in main reservoir pressure for supplying fluid from the main reservoir to the additional reservoir, and a second governor device subject to the pressure in the feed pipe and operated with main reservoir pressure in said pipe for also supplying fluid from the main reservoir to the additional reservoir.

In testimony whereof I have hereunto set my hand.

WALTER V. TURNER.